(12) United States Patent
Kaplanyan et al.

(10) Patent No.: US 10,964,098 B1
(45) Date of Patent: Mar. 30, 2021

(54) INVERSE PATH TRACING FOR MATERIAL AND LIGHTING ESTIMATION

(71) Applicant: Facebook Technologies, LLC, Menlo Park, CA (US)

(72) Inventors: Anton S. Kaplanyan, Redmond, WA (US); Dejan Azinovic, Garching (DE); Matthias Niessner, Garching bei München (DE); Tzu-Mao Li, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/293,335

(22) Filed: Mar. 5, 2019

(51) Int. Cl.
*G06T 15/20* (2011.01)
*G06T 15/50* (2011.01)
*G06K 9/62* (2006.01)

(52) U.S. Cl.
CPC .......... *G06T 15/506* (2013.01); *G06K 9/6202* (2013.01); *G06T 15/20* (2013.01)

(58) Field of Classification Search
CPC ............................ G06T 15/506; G06K 9/6202
See application file for complete search history.

(56) References Cited

U.S. PATENT DOCUMENTS

| | | | |
|---|---|---|---|
| 2010/0245609 A1* | 9/2010 | Estevez | G06T 7/174 348/222.1 |
| 2014/0184749 A1* | 7/2014 | Hilliges | G06T 17/00 348/47 |
| 2015/0243047 A1* | 8/2015 | Haglund | G06K 9/0063 382/201 |
| 2015/0262412 A1* | 9/2015 | Gruber | G06T 19/006 345/426 |
| 2016/0225164 A1* | 8/2016 | Tomlin | G06T 19/006 |
| 2017/0109931 A1* | 4/2017 | Knorr | G06T 7/11 |
| 2018/0082435 A1* | 3/2018 | Whelan | G06T 7/579 |
| 2019/0266788 A1* | 8/2019 | Huynh-Thu | G06F 30/23 |
| 2020/0202537 A1* | 6/2020 | Chan | G06T 7/194 |

\* cited by examiner

*Primary Examiner* — Terrell M Robinson
(74) *Attorney, Agent, or Firm* — Baker Botts L.L.P.

(57) ABSTRACT

In one embodiment, a computing system accesses a three-dimensional (3D) model of an environment, the 3D model comprising a virtual representation of an object in the environment. The computing system accesses an image of the object captured by a camera from a camera pose. The computing system accesses material parameters associated with a material property for the virtual representation of the object. The computing system renders, using the 3D model, pixels associated with the virtual representation of the object based on the material parameters associated with the virtual representation of the object, the pixels being rendered from a virtual perspective corresponding to the camera pose. The computing system determines updated material parameters associated with the material property for the virtual representation of the object based on a comparison of the rendered pixels to corresponding pixels located in the image of the object.

18 Claims, 6 Drawing Sheets

INVERSE PATH TRACING FOR MATERIAL AND LIGHTING ESTIMATION

TECHNICAL FIELD

This disclosure generally relates to controls and interfaces for user interactions and experiences in a virtual reality environment.

BACKGROUND

Virtual reality is a computer-generated simulation of an environment (e.g., a 3D environment) that users can interact with in a seemingly real or physical way. A virtual reality system, which may be a single device or a group of devices, may generate this simulation for display to a user, for example, on a virtual reality headset or some other display device. The simulation may include images, sounds, haptic feedback, and/or other sensations to imitate a real or imaginary environment. As virtual reality becomes more and more prominent, its range of useful applications is rapidly broadening. The most common applications of virtual reality involve games or other interactive content, but other applications such as the viewing of visual media items (e.g., photos, videos) for entertainment or training purposes are close behind. The feasibility of using virtual reality to simulate real-life conversations and other user interactions is also being explored.

SUMMARY OF PARTICULAR EMBODIMENTS

Disclosed herein are a variety of different ways of rendering and interacting with a virtual (or augmented) reality environment. A virtual reality system may render a virtual environment, which may include a virtual space that is rendered for display to one or more users. The users may view and interact within this virtual space and the broader virtual environment through any suitable means. One goal of the disclosed methods is to estimate material and lighting parameters associated with physical real-world objects. In particular embodiments, the virtual reality system may provide a method of determining material and lighting parameters of a virtual representation of the real-world object. The virtual reality system may also determine the positions of the lighting sources within the virtual space. By doing so, the virtual reality system may accurately represent a virtual representation of a real-world 3D environment to a user. The virtual reality system may also estimate material and lighting parameters associated with objects from computer generated images or other types of images. Currently, rendering a virtual space neglects the material parameters of the virtual objects and the lighting parameters of the virtual light sources. This is represented in most virtual spaces with the absence of the effects of occlusion and the like. To accurately estimate the material parameters of a virtual object and lighting parameters of a virtual light source, the virtual reality system may iteratively render images and compare the rendered images to an input image. Through the comparison the virtual reality system may determine the differences between the images on a pixel-by-pixel basis based on which object each of those pixels correspond to. In particular embodiments, the virtual reality system may update material parameters of virtual objects and lighting parameters of virtual light sources until the rendered image is similar enough to the input image it is based on.

Disclosed herein are a variety of different ways of rendering and interactive with a virtual (or augmented) reality environment. A virtual reality system may render a virtual environment, which may include a virtual space that is rendered for display to one or more users. The users may view and interact within this virtual space and the broader virtual environment through any suitable means. One goal of the disclosed methods is to provide an intuitive experience for users—one that gives the users a sense of "presence," or the feeling that they are actually in the virtual environment.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1B:
FIGS. 1A-1B illustrates a camera pose within a 3D environment and the same camera pose within a rendered 3D model.

Modern computer vision algorithms have brought significant advancement to 3D geometry reconstruction. However, illumination and material reconstruction remain less studied, with current approaches assuming very simplified models for materials and illumination. In particular embodiments, inverse path tracing may be an approach to jointly estimate the material properties of objects and light sources in indoor scenes by using an invertible light transport simulation. In particular embodiments, a coarse geometry scan may be given, along with corresponding images and camera poses. In particular embodiments, the use of inverse path tracing may provide an accurate and simultaneous retrieval of light sources and physically based material properties (e.g., diffuse reflectance, specular reflectance, roughness, etc.) for the purpose of editing and re-rendering the scene under new conditions. As an example and not by way of limitation, an optimization method may use a differentiable Monte Carlo renderer, which may compute derivatives with respect to the estimated unknown illumination and material properties. This may enable joint optimization for physically correct light transport and material models using a tailored stochastic gradient descent.

With the availability of inexpensive, commodity RGB-D sensors, there have been advances in 3D reconstruction techniques. While tracking and reconstruction quality have reached impressive levels, the estimation of lighting and materials has often been neglected. Unfortunately, this may present a serious problem for virtual- and mixed-reality applications, where it may be necessary to re-render scenes from different viewpoints, place virtual objects, edit scenes, or enable telepresence scenarios where a virtual person is placed in a different room. This problem has been viewed in the 2D image domain, resulting in a large body of work on intrinsic images or videos. However, the problem is severely under constrained on monocular RGB data due to lack of known geometry, and thus may require heavy regularization to jointly solve for lighting, material, and scene geometry. The problem may be more tractable in the context for given 3D reconstructions. However, even with depth data available, some methods, e.g., shading-based refinement or indoor re-lighting, may be based on simplistic lighting models, such as spherical harmonics (SH) or spatially-varying SH, which may cause issues on occlusion and view-dependent effects.

In particular embodiments, these issues may be addressed by formulating material and lighting estimation as a proper inverse rendering problem. As an example and not by way of limitation, an inverse path tracing algorithm that takes as input a given 3D scene along with a single or up to several captured RGB frames. For example, a differentiable Monte Carlo path tracer which may differentiate with respect to rendering parameters constrained on the difference of the rendered image and the target observations. In particular embodiments, these derivatives may be leveraged to solve for the material and lighting parameters by nesting the Monte Carlo path tracing process into a stochastic gradient descent (SGD) optimization.

In particular embodiments, the inverse path tracing algorithm may be tailored to 3D scenes, where scene geometry may be generally given but the material and lighting parameters are unknown. The inverse rendering formulation and its optimization may achieve significantly more accurate results as compared to current state-of-the-art lighting models. In particular embodiments, an end-to-end differentiable inverse path tracing formulation for joint material and lighting estimation and a flexible stochastic optimization framework with extendibility and flexibility for different materials and regularization terms may be used to improve upon 3D reconstruction techniques.

Figure 1A:
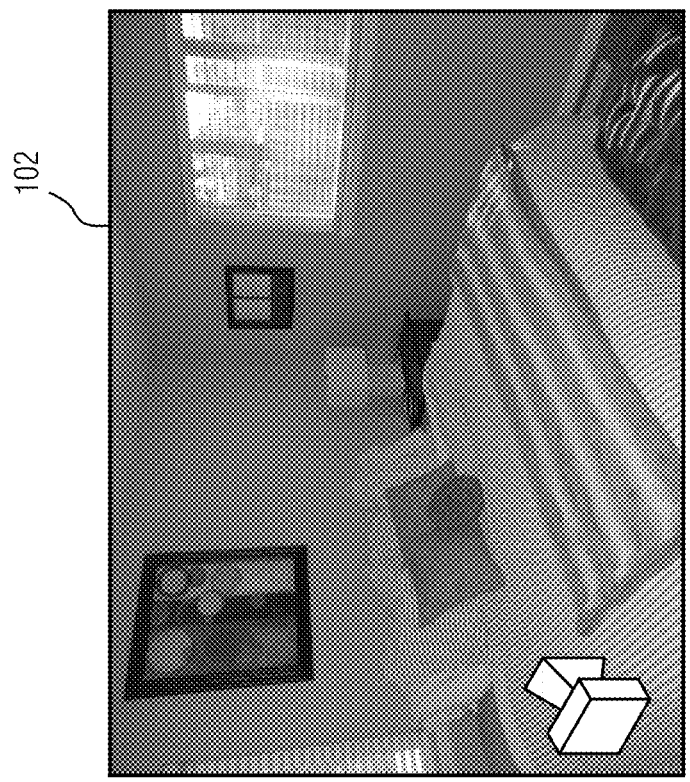

Referring to FIGS. 1A and 1B, an input image 102 and a rendered image 104 of a three-dimensional (3D) scene is shown. In particular embodiments, the input image 102 may be an image captured by a camera, a computer-generated image, or an image generated through any method. As an example and not by way of limitation, the image 102 may be used by a virtual reality system to render the image 104 by utilizing the techniques described herein. The virtual reality system may develop a 3D model of the 3D scene that is captured within the input image 102. Therefore, as an example and not by way of limitation, a user may recreate his or her bedroom in a virtual environment by capturing the bedroom through a plurality of images 102. A 3D model may be generated based on the plurality of images 102 captured. A camera is shown to represent that the camera pose of the camera may be important to render the image 104. The camera pose of the rendered image 104 may be similar to the camera pose of the captured image 102. That is, the camera may be placed in the same position and orientation within a 3D scene as the 3D model of the environment represented by the input image 102. The rendered image 104 may be in the same perspective of a camera that has the same camera pose as the camera that took (or generated from) the input image 102. By using the same camera poses within an input image 102 and a rendered image 104, the virtual reality system may accurately compare the images for processes described herein. The comparison of the input image 102 and the rendered image 104 may allow for proper estimation of material properties and the positions of the lighting sources. That is, the lighting sources that may be shown within an input image may not be shown in another input image. While only one input image 102 and one rendered image 104 is shown, the virtual reality system may use a plurality of input images 102 and rendered images 104 in order to determine light source parameters of the light sources and material properties of the materials within the 3D scene to accurately render a 3D model of the environment. By capturing the effects of light sources at different angles and objects at different angles, the light source parameters and material parameters may be accurately estimated. As an example and not by way of limitation, while an object may look like a glass table at a particular angle, through a plurality of images, the virtual reality system may determine that the object is made of wood. In particular embodiments, a 3D model of the 3D scene may be accessed as an input into the processes described herein. The 3D model may comprise virtual representations of real-world objects captured within the 3D scene.

In particular embodiments, the inverse path tracing method may employ physically based light transport simulation to estimate derivatives of all unknown parameters with respect to one or more rendered images. As an example and not by way of limitation, the rendering problem may generally be extremely high-dimensional and may therefore usually be solved using stochastic integration methods, such as Monte Carlo integration. In particular embodiments, differentiable path tracing may be nested into stochastic gradient descent to solve for the unknown scene parameters.

Figure 2:
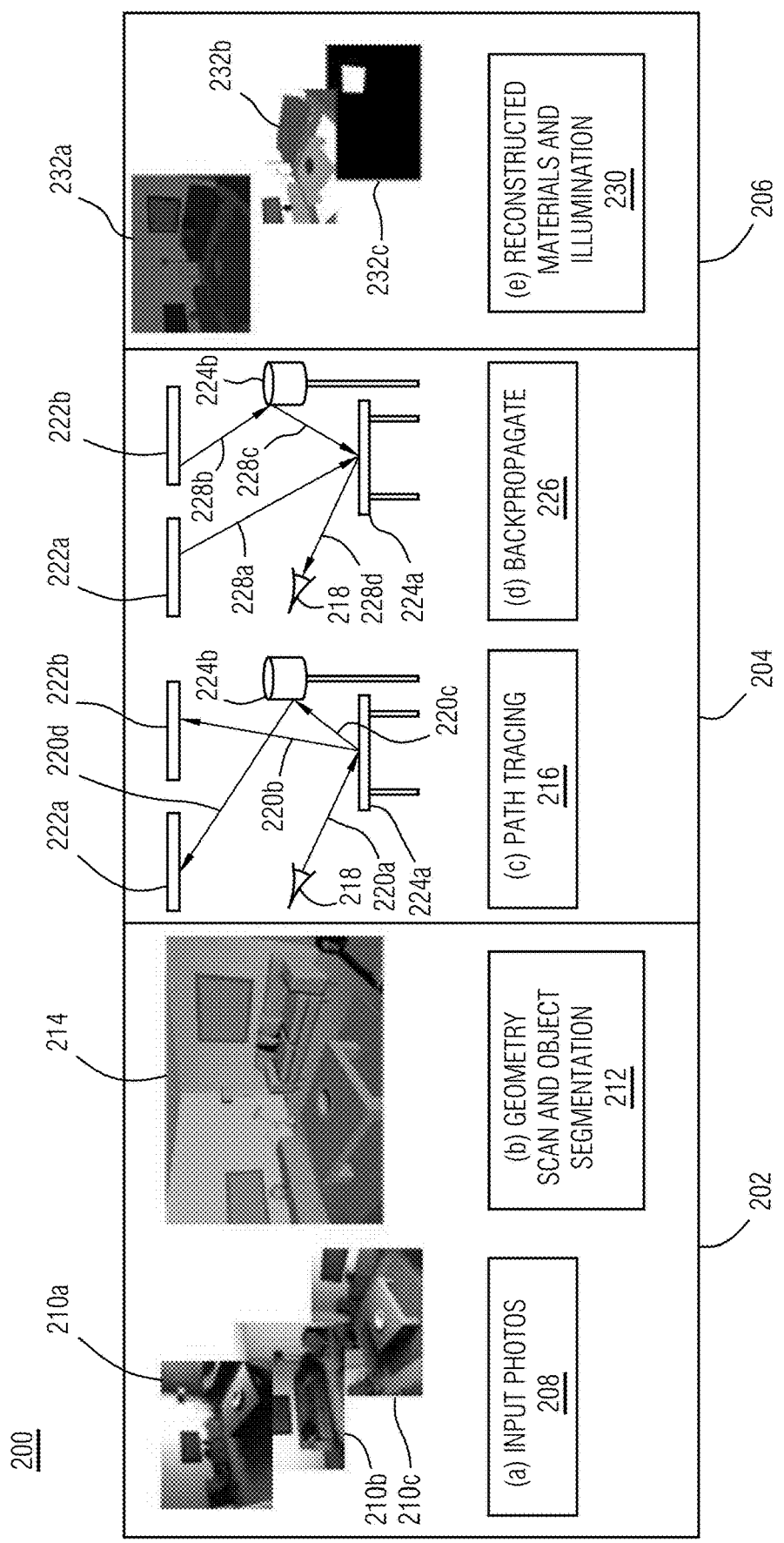
FIG. 2 illustrates an example process of using inverse path tracing to estimate material properties of objects within a 3D scene and positions of light sources within the 3D scene.

FIG. 2 illustrates an example process 200 of estimating material properties of objects within a 3D scene and positions of light sources within the 3D scene. In particular embodiments, the process 200 may include a plurality of different phases 202, 204, 206. The phases 202, 204, 206 may include an input phase 202, a processing phase 204, and a generation phase 206. In particular embodiments, the virtual reality system may retrieve, access, or the like to obtain data during the input phase 202. As an example and not by way of limitation, inputs may comprise the captured imagery, scene geometry, object segmentation of the scene, and an arbitrary initial guess of the illumination and material parameters. Material and emission properties may then be estimated by optimizing for rendered imagery to match the captured images. In particular embodiments, the input phase 202 may include an input photos step 208 where the virtual reality system accesses one or more input images 210 and a geometry scan and object segmentation step 212 where the virtual reality system determines the geometry of the 3D environment 214 with respect to the input photos 210. In particular embodiments, the virtual reality system may access a 3D model or generate a 3D model 214 based on the input photos 210. In particular embodiments, the processing phase 204 may include a path tracing step 216 and a backpropagate step 226. In particular embodiments, during the path tracing step 216, the virtual reality system may perform path tracing from a point of view 218 to determine the position of the light sources 222 through the light paths 220. In particular embodiments, the light paths 220 may bounce off the objects 224 within the 3D scene 214 and back to the light sources 222. In particular embodiments, during the backpropagate step 226, the virtual reality system may use light paths 228 to update the material properties of the objects 224 and update the positions of the light sources 222. By updating the material parameters of the material properties of objects 224 and the light source parameters of the lights sources 222, the virtual reality system may accurately render and re-render a virtual representation of the 3D scene 214. In particular embodiments, the generation phase 206 may generate images indicative of the material properties 232a, 232b and light source positions 232c among other images 232. These images 232 may be used to determine the material parameters and the light source parameters. After the parameters are determined, the virtual reality system may render an image based on the parameters and compare the rendered image to the input images 210 to determine whether an update to the parameters is required as described herein. In particular embodiments, one or more of the phases 202, 204, 206 may be repeated to accurately estimate the material parameters and the light source parameters. As an example and not by way of limitation, the backpropagate step 226 may be repeated to update the material parameters of the objects 224 within the 3D scene 214 and used to generate further images 232. These images 232 may be used to re-render an image to be compared to the input images 210.

In particular embodiments, the path tracer may render a noisy and under sampled version of the image 210 using Monte Carlo integration and computes derivatives of each sampled light path with respect to the unknowns. In particular embodiments, these derivatives may be passed as input to an optimizer to perform a single optimization step. This process may be performed iteratively until a correct solution is obtained. Path tracing may be a computationally expensive operation, and this optimization problem may be non-convex and ill-posed. In particular embodiments, variance reduction and regularization techniques may be employed for gradient computation to arrive at a converged solution within a reasonable amount of time, such as usually a few minutes on a single modern CPU.

In particular embodiments, if all scene and image parameters are known, an expected linear pixel intensity may be computed using light transport simulation. In particular embodiments, all surfaces may be assumed to be opaque and there is no participating media (e.g., fog) in the scene. As an example and not by way of limitation, the rendered intensity $I_R^j$ for pixel j may be computed using the path integral $$I_R^j = \int_\Omega h_j(X) f(X) d_\mu(X),$$

where $X=(x_0, \ldots, x_k)$ is a light path a list of vertices on the surfaces of the scene starting at the light source and ending at the sensor; the integral is a path integral taken over the space of all possible light paths of all lengths with a product area measure (•); $f(X)$ is the measurement contribution function of a light path X that computes how much energy flows through this particular path; and $h_j(X)$ is the pixel filter kernel of the sensor's pixel j, which is non-zero only when the light path X ends around the pixel j and incorporates sensor sensitivity at this pixel.

In particular embodiments, the path measurement contribution function f may contain the material parameters as well as the information about the light sources. In particular embodiments, for a path $X=(x_0, \ldots, x_k)$ of length k, the measurement contribution function may have the following form:

$$f(X) = L_e(x_0, \overline{x_0 x_1}) \prod_{i=1}^{k} f_r(x_i, \overline{x_{i-1} x_i}, \overline{x_i x_{i+1}}),$$

where $L_e$ is the radiance emitted at the scene surface point $x_0$ (beginning of the light path) towards the direction $\overline{x_0 x_1}$. At every interaction surface interaction vertex $x_i$ of the light path, there is a bidirectional reflectance distribution function (BRDF) $f_r(x_i, \overline{x_{i-1} x_i}, \overline{x_i x_{i+1}})$, defined. The BRDF may describe the material properties at the point $x_i$, i.e., how much light is scattered from the incident direction $\overline{x_{i-1} x_i}$ towards the outgoing direction $\overline{x_i x_{i+1}}$. In particular embodiments, the choice of the parametric BRDF model $f_r$ may be crucial to the range of materials that can be reconstructed by the system. In particular embodiments, both the BRDF $f_r$ and the emitted radiance $L_e$ may be unknown and the desired parameters to be found at every point on the scene manifold.

In particular embodiments, a series of images in the form of real-world photos or synthetic renderings, together with the reconstructed scene geometry and corresponding camera poses may be input into the virtual reality system as described above. In particular embodiments, the virtual reality system may be solving for the unknown material parameters M and lighting parameters L that will produce rendered images of the scene that are identical to the input images.

In particular embodiments, given the un-tone mapped captured pixel intensities $I_C^j$ at all pixels j of all images, and the corresponding noisy estimated pixel intensities $\tilde{I}_R^j$ (in linear color space), all of the material and illumination parameters θ={M, L} may be determined by solving the following optimization problem using stochastic gradient descent $$E(\Theta) = \sum_{j}^{N} |I_T^j - \tilde{I}_R^j| \to \min,$$

where N is the number of pixels in all images. In particular embodiments, using an $L_1$ norm as a loss function may help with robustness to outliers, such as extremely high contribution samples coming from Monte Carlo sampling.

In particular embodiments, in order to efficiently solve the minimization problem in using stochastic optimization, the gradient of the energy function E(θ) may be computed with respect to the set of unknown material and emission parameters θ

$$\nabla_\Theta = \sum_{j}^{N} \nabla_\Theta \tilde{I}_R^j \operatorname{sgn}(I_C^j - \tilde{I}_R^j),$$

where sgn(•) is the sign function, and $\nabla_\theta \tilde{I}_R^j$ is the gradient of Monte Carlo estimate with respect to all unknowns θ.

In particular embodiments, this equation for computing the gradient now may have two Monte Carlo estimates for each pixel j: (1) the estimate of pixel color itself $\tilde{I}_R^j$; and (2) the estimate of its gradient $\nabla_\theta \tilde{I}_R^j$. In particular embodiments, the expectation of product may be equal to the product of expectation when the random variables are independent, and as such independent samples may be drawn for each of these estimates to avoid introducing bias.

In particular embodiments, in order to compute the gradients of a Monte Carlo estimate with N samples for a single pixel j, unknowns that are touched by the measurement contribution function $f(X)$ for a sampled light path X may be determined. An explicit formula of the gradients may be obtained by differentiating the path contribution function using product rule (for brevity, some arguments for emission $L_e$ and BRDF $f_r$ are omitted):

$$\nabla_\Theta f(X) = \nabla_\Theta L_e(x_0) \prod_{i}^{k} f_r(x_i)$$

$$\nabla_\Theta f(X) = L_e(x_0) \sum_{l}^{k} \nabla_\Theta f_r(x_l) \prod_{i,i \neq l}^{k} f_r(x_i)$$

where the gradient vector $\nabla_\theta$ is very sparse and has nonzero gradients only for unknowns touched by the path $X_n$. In particular embodiments, the gradients of emissions and materials may have similar structure to the original path contribution function. Therefore, in particular embodiments, a similar path sampling strategy may be applied.

In some instances, the single-image problem can be directly extended to multiple images. In particular embodiments, given multiple views of a scene, it may be a goal to find parameters for which rendered images from these views match the input images. A set of multiple views can cover parts of the scene that are not covered by any single view from the set. This may be important for deducing the correct position of the light source in the scene. With many views, the method can better handle view-dependent effects such as specular and glossy highlights, which can be ill posed with just a single view, as they can also be explained as variations of albedo texture.

In particular embodiments, the material model may satisfy several properties. In particular embodiments, the material model may cover as much variability in appearance as possible, including such common effects as specular highlights, multilayered materials, and spatially varying textures. In particular embodiments, since each parameter adds another unknown to the optimization, the number of parameters may be kept to a minimal. Since a goal may be directed to re-rendering and related tasks, the material model may have interpretable parameters, so the users can adjust the parameters to achieve the desired appearance. In particular embodiments, the material properties may be optimized using first-order gradient-based optimization, and the range of the material parameters may be similar.

As an example and not by way of limitation, the materials may be represented using the Disney material model, the state-of-the-art physically based material model used in movie and game rendering. In particular embodiments, the material model may have a "base color" parameter which is used by both diffuse and specular reflectance, as well as 10 other parameters describing the roughness, anisotropy, and specularity of the material. In particular embodiments, all these parameters may be perceptually mapped to [0, 1], which may be both interpretable and suitable for optimization.

In particular embodiments, triangle meshes may be used to represent the scene geometry. Surface normals may be defined per-vertex and interpolated within each triangle using barycentric coordinates. The optimization may be performed on a per-object basis, e.g., every object has a single unknown emission and a set of material parameters that are assumed constant across the whole object. This may be enough to obtain accurate lighting and an average constant value for the albedo of an object.

In particular embodiments, for emission reconstruction, it may be assumed that all light sources are scene surfaces with an existing reconstructed geometry. For each emissive surface, the emitted radiance may be distributed according to a view-independent directional emission profile $L_e(x, i) = e(x)(i \cdot n(x))_+$, where e(x) is the unknown radiant flux at x; i is the emission direction at surface point x, n(x) is the surface normal at x and $(\cdot)_+$ is the dot product (cosine) clamped to only positive values. In particular embodiments, this may be a common emission profile for most of the area lights, which approximates most of the real soft interior lighting well. The method may also be extended to more complex or even unknown directional emission profiles or purely directional distant illumination (e.g., sky dome, sun) if needed.

In particular embodiments, the observed color of an object in a scene may be most easily explained by assigning emission to the triangle. This may be avoided by differences in shading of the different parts of the object. However, it can happen that there are no observable differences in the shading of an object, especially if the object covers only a few pixels in the input image. This may be a source of error during optimization. Another source of error may be Monte Carlo and SGD noise. These errors may lead to incorrect emission parameters for many objects after the optimization. The objects usually have a small estimated emission value when they should have none. In particular embodiments, to address the issue of a small estimated emission value an L1-regularizer may be used for the emission. The vast majority of objects in the scene is not an emitter and having such a regularizer may suppress the small errors for the emission parameters after optimization.

In particular embodiments, ADAM may be used as an optimizer with batch size B=8 estimated pixels and learning rate $5.10^{-3}$. To form a batch, B pixels may be sampled uniformly from the set of all pixels of all images. In particular embodiments, a higher batch size may be used to reduce the variance of each iteration. In particular embodiments, a smaller batch size may be used to have faster iterations.

In particular embodiments, more samples may be used to reduce the variance from SGD by estimating the pixel color and the derivatives, which may result in slower iterations. In particular embodiments, an important parameter may be the number of samples spent between pixel color and derivatives estimation. In particular embodiments, minimal variance may be achieved by using one sample to estimate the derivative and spend the remaining samples in the available computational budget to estimate the pixel color.

In particular embodiments, imperfections in the recovered geometry may have a big impact on the quality of material estimation. As an example and not by way of limitation most cameras, produce artifacts such as lens flare, motion blur or radial distortion. The method may potentially account for these imperfections by simulating the corresponding effects and optimize not only for the material parameters, but also for the camera parameters.

In particular embodiments, most diffuse global illumination effects may be approximated by as few as two bounces of light. As such, an image may be rendered with 10 bounces and it may be used as ground truth for the optimization. In particular embodiments, approximations of the ground truth may be done by renderings with one, two, and three bounces, respectively. One bounce may correspond to direct illumination; adding more bounces may allow the system to take into account indirect illumination as well. Optimization with only a single bounce may be the fastest, but the error remains high even after convergence. Having more than two bounces may lead to high variance and takes a lot of time to converge. As such, in particular embodiments, two bounces may be used to obtain a balance between convergence speed and accuracy.

In particular embodiments, both real and synthetic scenes with textured objects may be considered in order to evaluate surfaces with high-frequency surface signal. As such, the light sources and material parameters on the coarse per-object resolution following the non-textured resolution may be optimized first. Once converged, the light sources may be kept fixed, and all other regions may be subdivided based on the surface texture where the re-rendering error is high; i.e., every triangle may be subdivided based on its average $l_2$ error and continue until convergence. This coarse-to-fine strategy may allow the system to first separate out material and lighting in the more well-conditioned setting; in the second step, high-resolution material information may be obtained.

In particular embodiments, an application of the method may be to add virtual objects into an existing scene while maintaining a coherent appearance. The idea may include to first estimate the lighting and material parameters of objects within a given 3D scene or 3D reconstruction. After estimating the lighting and material parameters, a new 3D object may be inserted into the environment, and then the scene may be re-rendered using both the estimated lighting and material parameters for the already existing content and the known intrinsic parameters for the newly-inserted object. A complete 3D knowledge is required to produce photorealistic results in order to take interreflection and shadow between objects into consideration.

In particular embodiments, the inverse path tracer may be implemented in C++, and the processes may be run on a central processing unit. In particular embodiments, for all the optimizations, the emission and albedo may be initialized to zero. In particular embodiments, Embree may be used for the ray casting operations. In particular embodiments, for efficient implementation, instead of automatic differentiation, the light path gradients may be computed using manually-derived derivatives.

Figure 3:
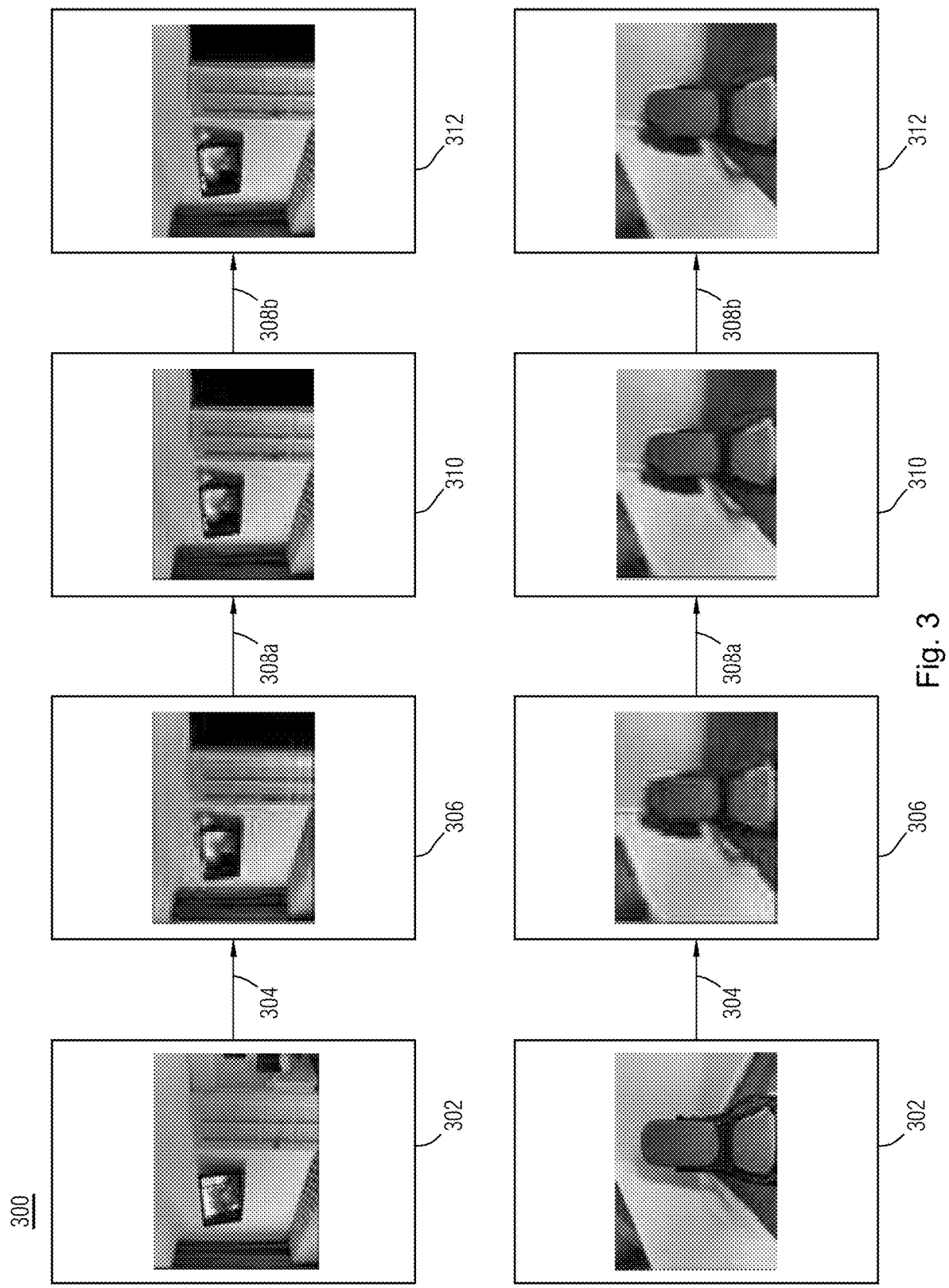
FIG. 3 illustrates example rendering processes using an optimization algorithm.

FIG. 3 illustrates example rendering processes 300 using an optimization algorithm as described herein. An input image 302 may be received or accessed from an image store. The input image 302 may comprise a plurality of objects. The virtual reality system may perform a rendering process 304 based on the input image 302. The rendering process 304 may render a virtual representation of each of the plurality of objects. In particular embodiments, the virtual reality system may access material parameters associated with the material property for a virtual representation of one of the objects within the image. As an example and not by way of limitation, the virtual reality system may perform an initial guess of the various parameters (e.g., material parameters, light source parameters, etc.) for the object. While a full image is shown rendered from the input image 302, the virtual reality system may render one or more pixels associated with a target object based on the initial parameters. In particular embodiments, the virtual reality system may render a plurality of pixels related to different objects based on their individual parameters in order to render the image 306. After rendering a first image 306, the virtual reality system may compare the rendered image 306 to the input image 302 and determine the differences by way of comparing each individual pixel to a corresponding pixel. As an example and not by way of limitation, the virtual reality system may determine the gradients and update the parameters for the respective object if the gradient exceeds a threshold. As shown in FIG. 3, the virtual reality system may determine the gradient between image 306 and image 302 exceeds a threshold and perform an update to the parameters of the objects within the image 306. In particular embodiments, the parameters of the objects may be updated using an optimization algorithm. Image 306 may be a rendered image of a virtual scene generated from the 3D scene captured within image 302. As an example and not by way of limitation, if the image 302 is capturing a bedroom, the virtual reality system may create a 3D model or access a 3D model of the bedroom that corresponds to the image 302. In particular embodiments, the virtual reality system may perform a re-rendering process 308a using the updated parameters and perform another comparison between the image 310 to the image 302. As shown in FIG. 3, the virtual reality system may determine the gradient between the image 310 and image 302 exceeds the threshold and may perform another iteration of the rendering process 308b to obtain an image 312. As shown in FIG. 3, the image 312 may be within the threshold gradient as compared to the image 302 and the virtual reality system may stop with the rendered image 312. Although one image is shown used in the rendering process, any number of images may be used to render images from the input images in the same perspective of image 302. Multiple images may allow for different perspectives of the same object within a 3D scene. In particular embodiments, any number of iterations may be performed to render an image that is within a threshold gradient of an input image 302. In particular embodiments, the virtual reality system may perform a threshold number of iterations to render an image from an input image 302.

Figure 4:
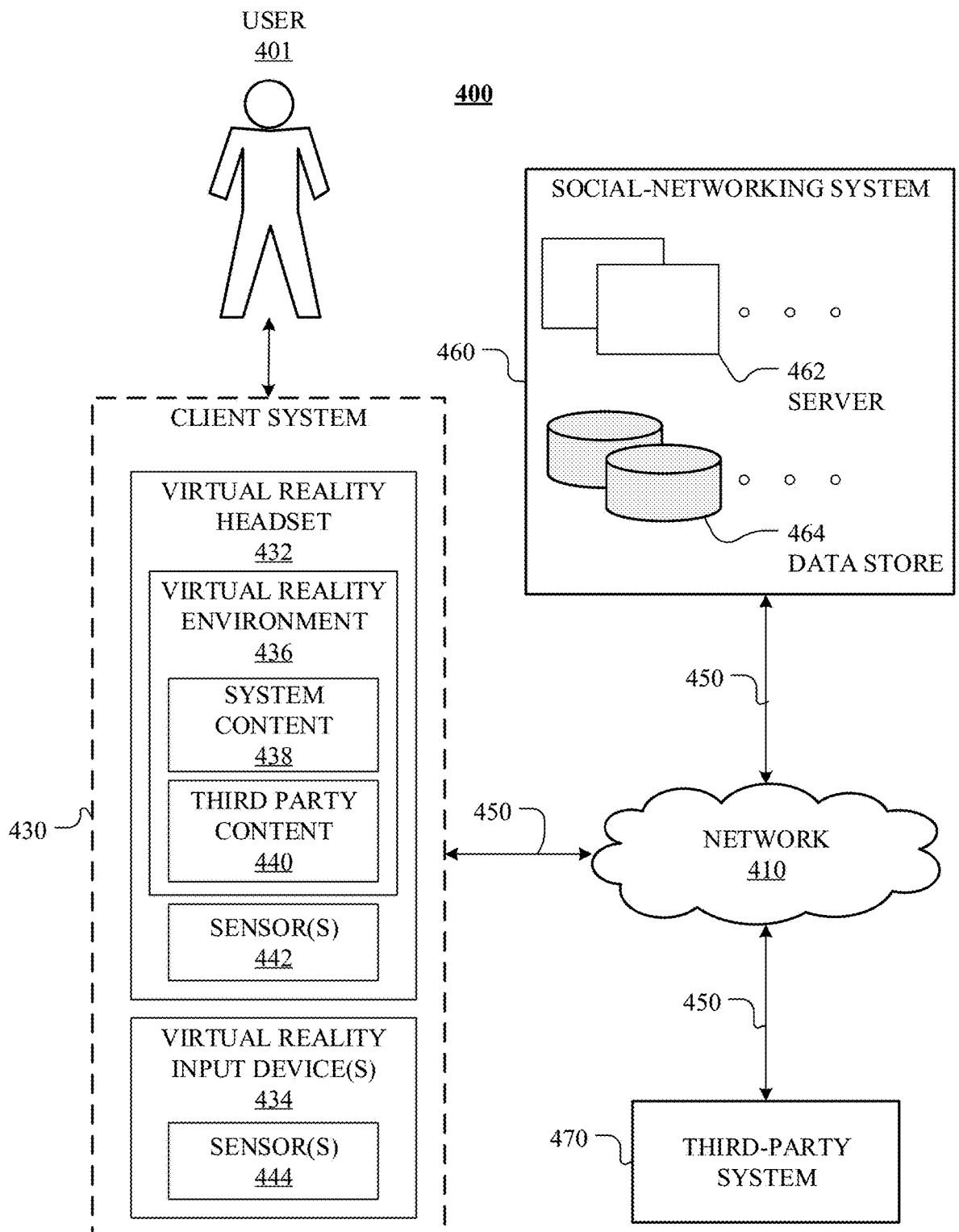
FIG. 4 illustrates an example network environment associated with a virtual reality system.

FIG. 4 illustrates an example network environment 400 associated with a virtual reality system. Network environment 400 includes a user 401 interacting with a client system 430, a social-networking system 460, and a third-party system 470 connected to each other by a network 410. Although FIG. 4 illustrates a particular arrangement of a user 401, a client system 430, a social-networking system 460, a third-party system 470, and a network 410, this disclosure contemplates any suitable arrangement of a user 401, a client system 430, a social-networking system 460, a third-party system 470, and a network 410. As an example and not by way of limitation, two or more of a user 401, a client system 430, a social-networking system 460, and a third-party system 470 may be connected to each other directly, bypassing a network 410. As another example, two or more of a client system 430, a social-networking system 460, and a third-party system 470 may be physically or logically co-located with each other in whole or in part. Moreover, although FIG. 4 illustrates a particular number of users 401, client systems 430, social-networking systems 460, third-party systems 470, and networks 410, this disclosure contemplates any suitable number of client systems 430, social-networking systems 460, third-party systems 470, and networks 410. As an example and not by way of limitation, network environment 400 may include multiple users 401, client systems 430, social-networking systems 460, third-party systems 470, and networks 410.

This disclosure contemplates any suitable network 410. As an example and not by way of limitation, one or more portions of a network 410 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 410 may include one or more networks 410.

Links 450 may connect a client system 430, a social-networking system 460, and a third-party system 470 to a communication network 410 or to each other. This disclosure contemplates any suitable links 450. In particular embodiments, one or more links 450 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 450 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 450, or a combination of two or more such links 450. Links 450 need not necessarily be the same throughout a network environment 400. One or more first links 450 may differ in one or more respects from one or more second links 450.

In particular embodiments, a client system 430 may be an electronic device including hardware, software, or embedded logic components or a combination of two or such components and capable of carrying out the appropriate functionalities implemented or supported by a client system 430. As an example and not by way of limitation, a client system 430 may include a computer system such as a desktop computer, notebook or laptop computer, netbook, a tablet computer, e-book reader, GPS device, camera, personal digital assistant (PDA), handheld electronic device, cellular telephone, smartphone, virtual reality headset and controllers, other suitable electronic device, or any suitable combination thereof. This disclosure contemplates any suitable client systems 430. A client system 430 may enable a network user at a client system 430 to access a network 410. A client system 430 may enable its user to communicate with other users at other client systems 430. A client system 430 may generate a virtual reality environment for a user to interact with content.

In particular embodiments, a client system 430 may include a virtual reality (or augmented reality) headset 432, such as OCULUS RIFT and the like, and virtual reality input device(s) 434, such as a virtual reality controller. A user at a client system 430 may wear the virtual reality headset 432 and use the virtual reality input device(s) to interact with a virtual reality environment 436 generated by the virtual reality headset 432. Although not shown, a client system 430 may also include a separate processing computer and/or any other component of a virtual reality system. A virtual reality headset 432 may generate a virtual reality environment 436, which may include system content 438 (including but not limited to the operating system), such as software or firmware updates and also include third-party content 440, such as content from applications or dynamically downloaded from the Internet (e.g., web page content). A virtual reality headset 432 may include sensor(s) 442, such as accelerometers, gyroscopes, magnetometers to generate sensor data that tracks the location of the headset device 432. The headset 432 may also include eye trackers for tracking the position of the user's eyes or their viewing directions. The client system may use data from the sensor(s) 442 to determine velocity, orientation, and gravitation forces with respect to the headset. Virtual reality input device(s) 434 may include sensor(s) 444, such as accelerometers, gyroscopes, magnetometers, and touch sensors to generate sensor data that tracks the location of the input device 434 and the positions of the user's fingers. The client system 430 may make use of outside-in tracking, in which a tracking camera (not shown) is placed external to the virtual reality headset 432 and within the line of sight of the virtual reality headset 432. In outside-in tracking, the tracking camera may track the location of the virtual reality headset 432 (e.g., by tracking one or more infrared LED markers on the virtual reality headset 432). Alternatively or additionally, the client system 430 may make use of inside-out tracking, in which a tracking camera (not shown) may be placed on or within the virtual reality headset 432 itself. In inside-out tracking, the tracking camera may capture images around it in the real world and may use the changing perspectives of the real world to determine its own position in space.

Third-party content 440 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 430 may enter a Uniform Resource Locator (URL) or other address directing a web browser to a particular server (such as server 462, or a server associated with a third-party system 470), and the web browser may generate a Hyper Text Transfer Protocol (HTTP) request and communicate the HTTP request to server. The server may accept the HTTP request and communicate to a client system 430 one or more Hyper Text Markup Language (HTML) files responsive to the HTTP request. The client system 430 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, the social-networking system 460 may be a network-addressable computing system that can host an online social network. The social-networking system 460 may generate, store, receive, and send social-networking data, such as, for example, user-profile data, concept-profile data, social-graph information, or other suitable data related to the online social network. The social-networking system 460 may be accessed by the other components of network environment 400 either directly or via a network 410. As an example and not by way of limitation, a client system 430 may access the social-networking system 460 using a web browser of a third-party content 440, or a native application associated with the social-networking system 460 (e.g., a mobile social-networking application, a messaging application, another suitable application, or any combination thereof) either directly or via a network 410. In particular embodiments, the social-networking system 460 may include one or more servers 462. Each server 462 may be a unitary server or a distributed server spanning multiple computers or multiple datacenters. Servers 462 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 462 may include hardware, software, or embedded logic components or a combination of two or more such components for carrying out the appropriate functionalities implemented or supported by server 462. In particular embodiments, the social-networking system 460 may include one or more data stores 464. Data stores 464 may be used to store various types of information. In particular embodiments, the information stored in data stores 464 may be organized according to specific data structures. In particular embodiments, each data store 464 may be a relational, columnar, correlation, or other suitable database. Although this disclosure describes or illustrates particular types of databases, this disclosure contemplates any suitable types of databases. Particular embodiments may provide interfaces that enable a client system 430, a social-networking system 460, or a third-party system 470 to manage, retrieve, modify, add, or delete, the information stored in data store 464.

In particular embodiments, the social-networking system 460 may store one or more social graphs in one or more data stores 464. In particular embodiments, a social graph may include multiple nodes—which may include multiple user nodes (each corresponding to a particular user) or multiple concept nodes (each corresponding to a particular concept)—and multiple edges connecting the nodes. The social-networking system 460 may provide users of the online social network the ability to communicate and interact with other users. In particular embodiments, users may join the online social network via the social-networking system 460 and then add connections (e.g., relationships) to a number of other users of the social-networking system 460 whom they want to be connected to. Herein, the term "friend" may refer to any other user of the social-networking system 460 with whom a user has formed a connection, association, or relationship via the social-networking system 460.

In particular embodiments, the social-networking system 460 may provide users with the ability to take actions on various types of items or objects, supported by the social-networking system 460. As an example and not by way of limitation, the items and objects may include groups or social networks to which users of the social-networking system 460 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 460 or by an external system of a third-party system 470, which is separate from the social-networking system 460 and coupled to the social-networking system 460 via a network 410.

In particular embodiments, the social-networking system 460 may be capable of linking a variety of entities. As an example and not by way of limitation, the social-networking system 460 may enable users to interact with each other as well as receive content from third-party systems 470 or other entities, or to allow users to interact with these entities through an application programming interfaces (API) or other communication channels.

In particular embodiments, a third-party system 470 may include one or more types of servers, one or more data stores, one or more interfaces, including but not limited to APIs, one or more web services, one or more content sources, one or more networks, or any other suitable components, e.g., that servers may communicate with. A third-party system 470 may be operated by a different entity from an entity operating the social-networking system 460. In particular embodiments, however, the social-networking system 460 and third-party systems 470 may operate in conjunction with each other to provide social-networking services to users of the social-networking system 460 or third-party systems 470. In this sense, the social-networking system 460 may provide a platform, or backbone, which other systems, such as third-party systems 470, may use to provide social-networking services and functionality to users across the Internet.

In particular embodiments, a third-party system 470 may include a third-party content object provider. A third-party content object provider may include one or more sources of content objects, which may be communicated to a client system 430. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 460 also includes user-generated content objects, which may enhance a user's interactions with the social-networking system 460. User-generated content may include anything a user can add, upload, send, or "post" to the social-networking system 460. As an example and not by way of limitation, a user communicates posts to the social-networking system 460 from a client system 430. Posts may include data such as status updates or other textual data, location information, photos, videos, links, music or other similar data or media. Content may also be added to the social-networking system 460 by a third-party through a "communication channel," such as a newsfeed or stream.

In particular embodiments, the social-networking system 460 may include a variety of servers, sub-systems, programs, modules, logs, and data stores. In particular embodiments, the social-networking system 460 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 460 may also include suitable components such as network interfaces, security mechanisms, load balancers, failover servers, management-and-network-operations consoles, other suitable components, or any suitable combination thereof. In particular embodiments, the social-networking system 460 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 460 to one or more client systems 430 or one or more third-party systems 470 via a network 410. The web server may include a mail server or other messaging functionality for receiving and routing messages between the social-networking system 460 and one or more client systems 430. An API-request server may allow a third-party system 470 to access information from the social-networking system 460 by calling one or more APIs. An action logger may be used to receive communications from a web server about a user's actions on or off the social-networking system 460. In conjunction with the action log, a third-party-content-object log may be maintained of user exposures to third-party-content objects. A notification controller may provide information regarding content objects to a client system 430. Information may be pushed to a client system 430 as notifications, or information may be pulled from a client system 430 responsive to a request received from a client system 430. Authorization servers may be used to enforce one or more privacy settings of the users of the social-networking system 460. A privacy setting of a user determines how particular information associated with a user can be shared. The authorization server may allow users to opt in to or opt out of having their actions logged by the social-networking system 460 or shared with other systems (e.g., a third-party system 470), such as, for example, by setting appropriate privacy settings. Third-party-content-object stores may be used to store content objects received from third parties, such as a third-party system 470. Location stores may be used for storing location information received from client systems 430 associated with users. Advertisement-pricing modules may combine social information, the current time, location information, or other suitable information to provide relevant advertisements, in the form of notifications, to a user.

Figure 5:
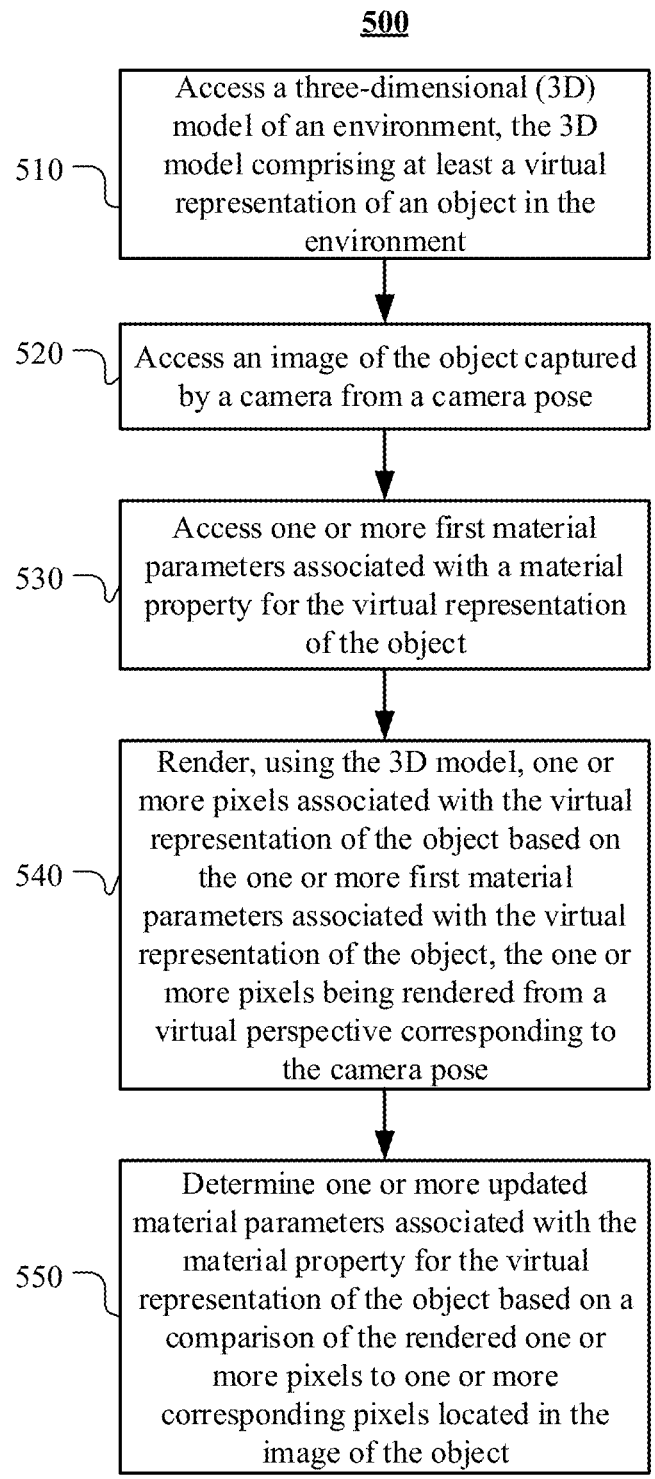
FIG. 5 illustrates an example method for rendering pixels associated with a virtual representation of an object.

FIG. 5 illustrates an example method 500 for rendering pixels associated with a virtual representation of an object. In particular embodiments, a virtual reality headset 132 may be used to render the pixels associated with a virtual representation of the object. The method may begin at step 510, where a computing system (e.g., virtual reality system) may access a three-dimensional (3D) model of an environment, the 3D model comprising at least a virtual representation of an object in the environment. At step 520, the computing system may access an image of the object captured by a camera from a camera pose. At step 530, the computing system may access one or more first material parameters associated with a material property for the virtual representation of the object. At step 540, the computing system may render, using the 3D model, one or more pixels associated with the virtual representation of the object based on the one or more first material parameters associated with the virtual representation of the object, the one or more pixels being rendered from a virtual perspective corresponding to the camera pose. At step 550, the computing system may determine one or more updated material parameters associated with the material property for the virtual representation of the object based on a comparison of the rendered one or more pixels to one or more corresponding pixels located in the image of the object. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for rendering pixels associated with a virtual representation of an object, including the particular steps of the method of FIG. 5, this disclosure contemplates any suitable method of rendering pixels associated with a virtual representation of an object, including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Although this disclosure describes and illustrates processes in context of a virtual reality headset 132 performing various functions, a computing system (e.g., a server embodied as social-networking system 160 or third-party system 170) may handle the processing and send the results to a virtual reality headset 132. In particular embodiments, a computing system may receive images and send off for processing.

Figure 6:
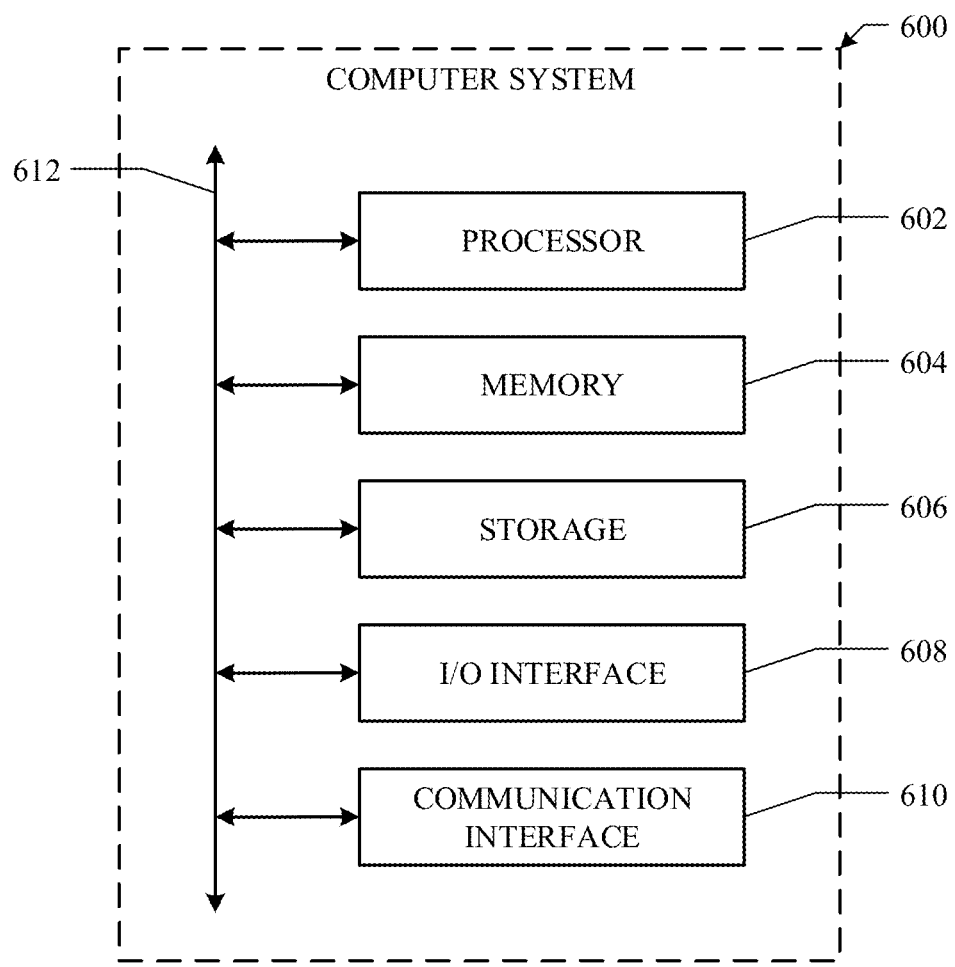
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
accessing a three-dimensional (3D) model of an environment, the 3D model comprising at least a virtual representation of an object in the environment;
accessing an image of the object captured by a camera from a camera pose;
accessing one or more first material parameters associated with a material property for the virtual representation of the object;
rendering, using the 3D model, one or more pixels associated with the virtual representation of the object based on the one or more first material parameters associated with the virtual representation of the object, the one or more pixels being rendered from a virtual perspective corresponding to the camera pose;
comparing the one or more rendered pixels to one or more corresponding pixels located in the image of the object to determine a difference between the one or more rendered pixels and the one or more corresponding pixels located in the image of the object; and
determining one or more updated material parameters associated with the material property for the virtual representation of the object based on the difference determined from the comparison of the one or more rendered pixels to the one or more corresponding pixels located in the image of the object.

2. The method of claim 1, wherein accessing the one or more first material parameters further comprises retrieving one or more stored values for the one or more first material parameters.

3. The method of claim 1, further comprising:
accessing a plurality of images of the object captured by the camera from a plurality of camera poses;
rendering, using the 3D model, the one or more pixels associated with the virtual representation of the object based on the one or more first material parameters associated with the virtual representation of the object, the one or more pixels being rendered from a virtual perspective corresponding to each of the plurality of camera poses; and
determining one or more updated material parameters associated with the material property for the virtual representation of the object based on a comparison of the one or more rendered pixels to each of one or more corresponding pixels located in the plurality of images of the object.

4. The method of claim 1, further comprising:
accessing one or more first light source parameters associated with a virtual representation of a light source in the environment, wherein the rendering of the one or more pixels associated with the virtual representation of the object is further based on the one or more first light source parameters; and
determining one or more updated light source parameters associated with the virtual representation of the light source based on a comparison of the one or more rendered pixels to the one or more corresponding pixels located in the image of the object.

5. The method of claim 4, wherein accessing the one or more first light source parameters comprises one or more of performing an initial guess of the one or more first light source parameters or retrieving one or more stored values for the one or more first light source parameters.

6. The method of claim 4, further comprising:
accessing one or more second light source parameters associated with the virtual representation of the light source, wherein the one or more second light source parameters correspond to the one or more updated light source parameters for the virtual representation of the light source;
rendering, using the 3D model, one or more second pixels associated with the virtual representation of the object based on the one or more second light source parameters associated with the virtual representation of the light source, the one or more second pixels being rendered from the virtual perspective corresponding to the camera pose; and
determining one or more third light source parameters associated with the light source based on a comparison of the one or more rendered second pixels to the one or more corresponding pixels located in the image of the object.

7. The method of claim 4, further comprising:
determining a difference between the one or more rendered pixels and the one or more corresponding pixels located in the image of the object.

8. The method of claim 7, wherein the determination of the one or more updated light source parameters is responsive to determining the difference between the one or more rendered pixels and the one or more corresponding pixels exceeds a threshold difference.

9. The method of claim 7, wherein the determination of the one or more updated light source parameters is based on the difference between the one or more rendered pixels and the one or more corresponding pixels.

10. The method of claim 7, wherein the determination of the updated light source parameters associated with the light source results in the updated light source parameters equal to the one or more first light source parameters responsive to determining the difference between the one or more rendered pixels and the one or more corresponding pixels is below a threshold difference.

11. The method of claim 1, further comprising generating a complete frame representative of the image of the object captured by the camera from the camera pose based on the one or more rendered pixels.

12. The method of claim 1, wherein the determination of the one or more updated material parameters is responsive to determining the difference between the one or more rendered pixels and the one or more corresponding pixels exceeds a threshold difference.

13. The method of claim 1, wherein the determination of the one or more updated material parameters is based on the difference between the one or more rendered pixels and the one or more corresponding pixels.

14. The method of claim 1, wherein the determination of the updated material parameters associated with the material property for the virtual representation of the object results in the updated material parameters equal to the one or more first material parameters responsive to determining the difference between the one or more rendered pixels and the one or more corresponding pixels is below a threshold difference.

15. The method of claim 1, further comprising:
accessing one or more second material parameters associated with the material property for the virtual representation of the object, wherein the one or more second material parameters correspond to the one or more updated material parameters for the virtual representation of the object;
rendering, using the 3D model, one or more second pixels associated with the virtual representation of the object based on the one or more second material parameters associated with the virtual representation of the object, the one or more second pixels being rendered from the virtual perspective corresponding to the camera pose; and determining one or more third material parameters associated with the material property for the virtual representation of the object based on a comparison of the one or more rendered second pixels to the one or more corresponding pixels located in the image of the object.

16. The method of claim 1, wherein the determining the one or more updated material parameters is based on an optimization algorithm.

17. One or more computer-readable non-transitory storage media embodying software that is operable when executed to:

access a three-dimensional (3D) model of an environment, the 3D model comprising at least a virtual representation of an object in the environment;

access an image of the object captured by a camera from a camera pose;

access one or more first material parameters associated with a material property for the virtual representation of the object;

render, using the 3D model, one or more pixels associated with the virtual representation of the object based on the one or more first material parameters associated with the virtual representation of the object, the one or more pixels being rendered from a virtual perspective corresponding to the camera pose;

compare the one or more rendered pixels to one or more corresponding pixels located in the image of the object to determine a difference between the one or more rendered pixels and the one or more corresponding pixels located in the image of the object; and determine one or more updated material parameters associated with the material property for the virtual representation of the object based on the difference determined from the comparison of the one or more rendered pixels to the one or more corresponding pixels located in the image of the object.

18. A system comprising: one or more processors; and a non-transitory memory coupled to the processors comprising instructions executable by the processors, the processors operable when executing the instructions to:

access a three-dimensional (3D) model of an environment, the 3D model comprising at least a virtual representation of an object in the environment;

access an image of the object captured by a camera from a camera pose;

access one or more first material parameters associated with a material property for the virtual representation of the object;

render, using the 3D model, one or more pixels associated with the virtual representation of the object based on the one or more first material parameters associated with the virtual representation of the object, the one or more pixels being rendered from a virtual perspective corresponding to the camera pose;

compare the one or more rendered pixels to one or more corresponding pixels located in the image of the object to determine a difference between the one or more rendered pixels and the one or more corresponding pixels located in the image of the object; and determine one or more updated material parameters associated with the material property for the virtual representation of the object based on the difference determined from the comparison of the one or more rendered pixels to the one or more corresponding pixels located in the image of the object.

* * * * *